(12) United States Patent
Schnitzenbaumer

(10) Patent No.: US 6,206,399 B1
(45) Date of Patent: Mar. 27, 2001

(54) BICYCLE BODY SUPPORT AND BRACE

(76) Inventor: Francis X. Schnitzenbaumer, 1319 S. Coast Hwy., Oceanside, CA (US) 92054

( * ) Notice: Subject to any disclaimer, the term of this patent is extended or adjusted under 35 U.S.C. 154(b) by 0 days.

(21) Appl. No.: 08/843,486

(22) Filed: Apr. 16, 1997

Related U.S. Application Data

(63) Continuation-in-part of application No. 08/617,474, filed on Mar. 15, 1996, now abandoned.

(51) Int. Cl.[7] ............................................. B26J 1/28
(52) U.S. Cl. ........................ 280/304.4; 297/215.12; 297/354.1
(58) Field of Search ..................... 280/288.4, 290, 280/304.4; 297/215.1, 215.11, 215.12, 195.1, 363, 373, 354.1, 354.11, 408, DIG. 6

(56) References Cited

U.S. PATENT DOCUMENTS

| | | | |
|---|---|---|---|
| 553,722 | * | 1/1896 | Prall ................................. 280/304.4 |
| 620,688 | * | 3/1899 | Wood . | |
| 626,852 | * | 6/1899 | Bemis . | |
| 1,113,833 | * | 10/1914 | Ruff ................................. 280/304.4 |
| 1,139,184 | * | 5/1915 | Johnson . | |
| 4,108,462 | * | 8/1978 | Martin ............................. 280/304.4 |
| 4,313,639 | * | 2/1982 | Ware ................................ 297/366 |
| 4,466,660 | * | 8/1984 | Mabie ............................... 297/195 |
| 4,475,770 | * | 10/1984 | Persons ............................. 297/355 |
| 5,026,119 | * | 6/1991 | Frank et al. ...................... 297/383 |
| 5,501,476 | * | 3/1996 | Howell ............................. 280/230 |

FOREIGN PATENT DOCUMENTS

| | | | |
|---|---|---|---|
| 791658 | * | 12/1935 | (FR) ............................. 297/215.12 |
| 812421 | * | 5/1937 | (FR) . |

* cited by examiner

Primary Examiner—Anne Marie Boehler

(57) ABSTRACT

A generally C-shaped arm (18) is releasably and adjustably connected to the seat tube (24) of a bicycle to extend rearwardly and upwardly of the seat. At the arm upper end a plate (34) is affixed having a replaceable pad (38) which braces the body of the bicycle user especially during high performance use. A further embodiment utilizes a sphere (42) rotatably located within a chamber to provide a wide adjustment range for the pad (38). In another embodiment the C-shaped arm is composed of two parts (46, 48) selectively interconnectable to provide a corresponding variety of adjustments for pad to body spatial arrangement.

7 Claims, 5 Drawing Sheets

BICYCLE BODY SUPPORT AND BRACE

This is a continuation-in-part of Ser. No. 08/617,474 filed Mar. 15, 1996, now abandoned.

BACKGROUND

1. Background of the Invention

The present invention relates generally to bicycles, and, more particularly, to apparatus adjustably affixed to the bicycle for securing and supporting the back of a user to aid in providing more efficient and comfortable usage of the bicycle.

2. Description of Related Art

The usual bicycle seat has a relatively large, generally horizontal portion for holding the buttocks and a smaller portion forwardly thereof for crotch support. A predominant mode of use of this seat is for the rider to remain seated on the seat while operating the pedals.

A different mode of operation is contemplated in U.S. Pat. No. 4,108,462 where the seat 40 is angularly positioned such that the cyclist in a rest position is leaning the buttocks backwardly against the seat and partially presenting body weight downwardly on the seat.

In U.S. Pat. No. 553,722 in addition to a conventional seat 2 there is provided a support 16 spring-mounted to the bicycle frame just behind the seat against which a rider can brace his back enabling strong pedal exertion without lifting from the seat and wasting energy.

SUMMARY OF THE INVENTION

The present invention relates generally to apparatus for use with a bicycle which increases efficiency of energy transfer to the bicycle and, at the same time, is more comfortable for the individual powering the bicycle whether it is operated at the slow, medium or top speed at which a given individual user is capable. The invention is especially advantageous when used in bicycle racing where exertion must be maintained at a high level for a relatively long period of time.

It is a fundamental concept and aspect of the present invention to provide a support means against which the back of the user of a bicycle can brace during forward thrusting against the pedals for simultaneously providing an increase in the pedal thrust motion and a resting aspect for the back thereby adding to the efficiency of operation by preserving strength and lasting power of the user.

According to a first embodiment, the back support and bracing means includes a generally C-shaped arm one end of which includes a slotted cylindrical connector for sliding receipt onto the upper end portion of the bicycle seat tube. Optionally, either a quick release finger operated clamp or a nut and bolt arrangement can be used for securing the arm to the seat tube. The opposite end of the arm has a plate onto which a removable pad positioned to face toward and slightly downwardly of the back of a bicycle user. The pad is constructed of plastic foam, for example, such that in view of its high wear usage in being repeatedly contacted by the back of the bicycle user, replacement can be easily made either routinely periodically or when needed.

An alternative version includes a ball joint connection between the plate and C-shaped arm providing multi-directional pad adjustment. A still further embodiment includes a variable connector linking two parts forming the C-shaped arm such that they may be adjusted with respect to each other to produce a changing aspect of the pad.

In use, on thrusting forward with the feet and legs to drive the pedals, this moves the back slightly rearwardly and upwardly to the point where the back engages the pad on the support means. From that moment on, further thrusting is aided by bracing the back against the pad which action simultaneously has a resting effect on the back to further enhance overall efficiency of bicycle use.

In yet another embodiment the C-shaped arm is formed into arc of smaller radius such that the pad continuously bears against the lower back region of a cyclist which is especially advantageous in racing.

In still yet another version, a generally C-shaped arm adjustably interconnects at one end to the regular seat post and has a padlike cushion on the other end for contacting the buttocks or just below the kidney region.

BRIEF DESCRIPTION OF THE DRAWING

These and other objects and advantages of the invention will become more readily apparent upon reading the following detailed description and upon reference to the attached drawings in which.

DESCRIPTION OF PREFERRED EMBODIMENTS

Figure 1:
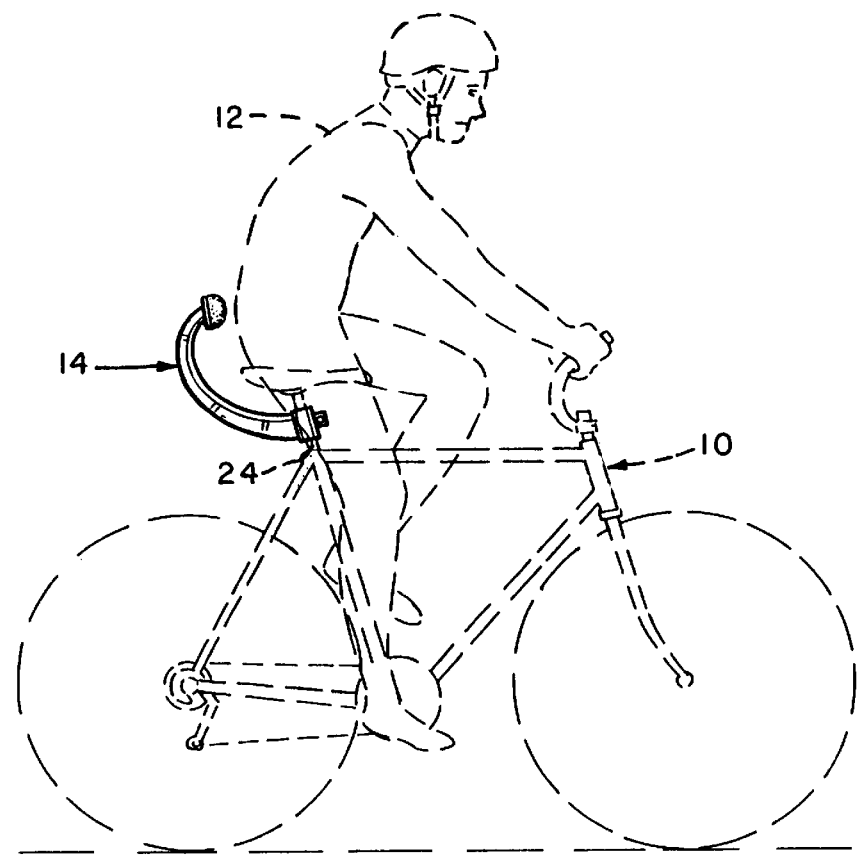
FIG. 1 is a side elevational view of a bicycle equipped with the support and bracing means of the invention shown during typical average speed use of the bicycle.

Turning now to the drawing and particularly FIG. 1, there is shown a conventional bicycle 10 on which a user 12 of the bicycle is mounted on a seat 13 and propelling the vehicle in a normal manner with average amount of energy being applied such that the user can remain seated for the most part. A supporting and bracing means 14 of a first embodiment of the present invention, which will be more particularly described herein, is seen to be located generally just rearwardly of the seat 13 and which has a pad (at normal speed) that will be positioned slightly spaced from the back of the user and does not contact the back of the user in a pressurizing manner unless the user leans or moves in a rearward direction.

Figure 2:
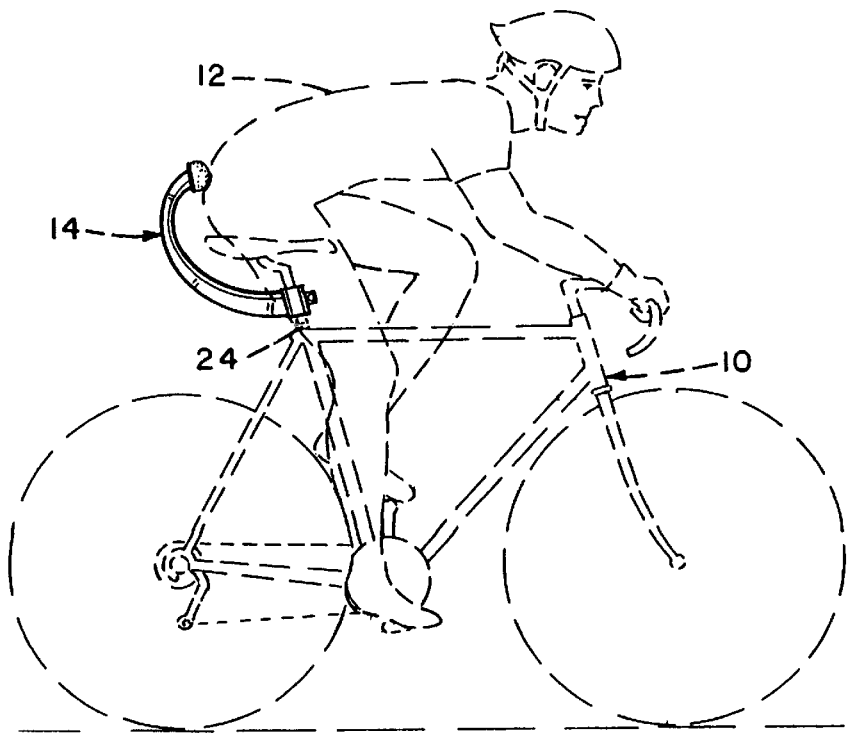
FIG. 2 is a side elevational view of a view similar to FIG. 1 showing the bicycle of the present invention while used in sprinting or speed use of the bicycle.

On the other hand, if the user 12 wishes to exert more force on the pedals as, for example, in climbing a steep hill or in attempting to achieve or maintain a high rate of speed, the individual user automatically rises from the seat at least a slight amount in order to better exert downward and forward force onto the pedals (FIG. 2). When so moving, the buttocks or adjacent back of the individual will at the same time tend to go slightly upwardly and farther to the rear bringing the user into direct pressure-exerting contact with the means 14. This contact provides support for both the back and legs at the time of maximum force exertion and, as well, provides bracing enabling the user to exert, in a more efficient and convenient manner, a greater leg and body force against the pedals.

Figure 3:
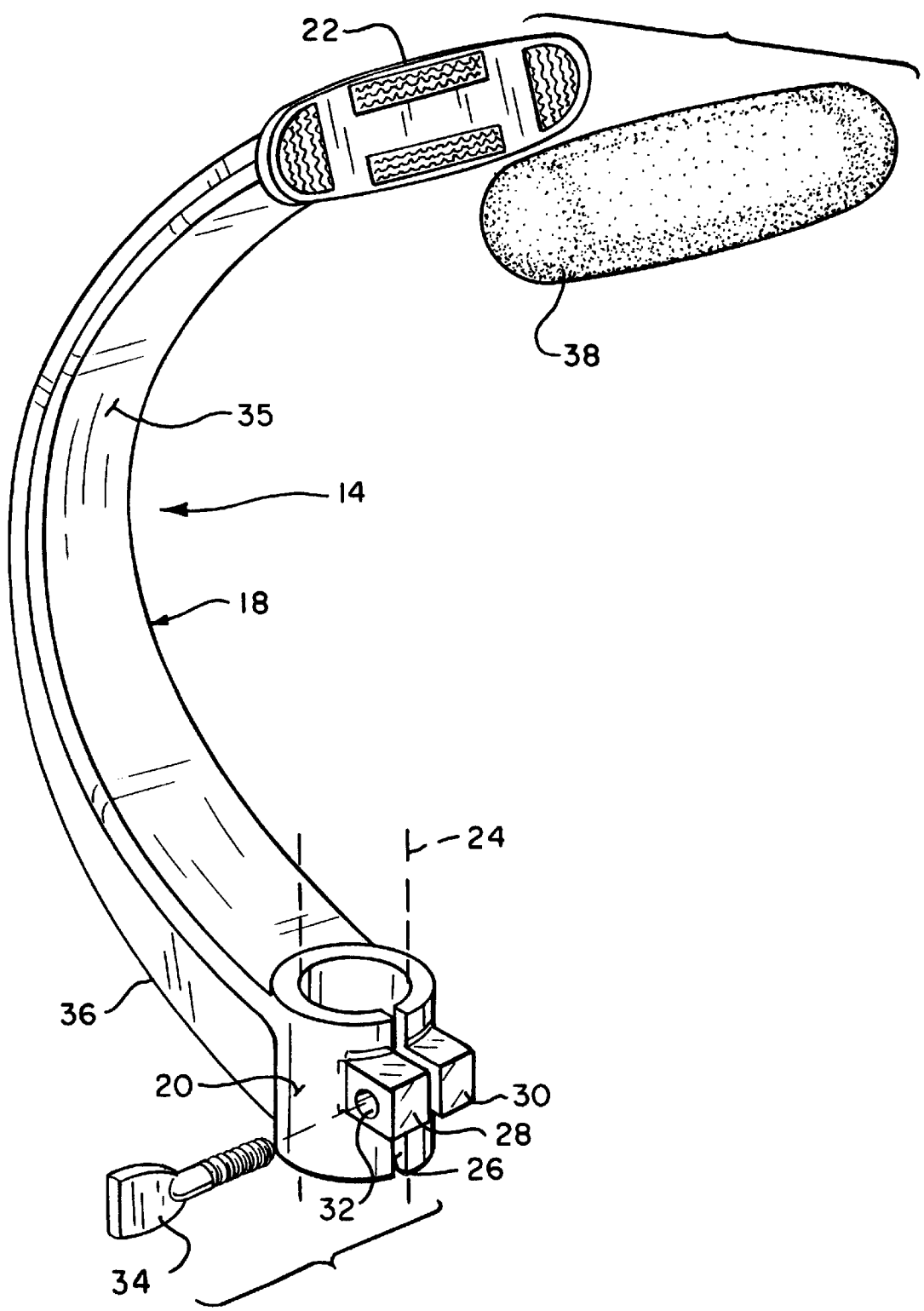
FIG. 3 is a perspective, enlarged, partially fragmentary view of the support and bracing means of the present invention.

Turning now to FIG. 3, the supporting and bracing means 14 is seen to be of unitary construction including a generally C-shaped arm 18 having a tubular connector 20 at one end and at the opposite or upper end a pressure plate or contact means 22. Connector 20 is a generally cylindrical member having an overall length L of at least 2.0 inches and an internal diameter enabling ready sliding receipt onto a seat tube 24, the latter being a generally vertical rod-like member onto the upper end of which the bicycle seat is typically affixed. The means 22 is canted with respect to a vertical line to the ground plane so as to face toward the back of the rider 12 and downwardly toward the seat.

A slot 26 is formed in a sidewall of the connector 20 and has at each side first and second outwardly extending flanges 28 and 30 facing one another and including a pair of aligned openings 32 extending therethrough. The internal diameter of the connector and the spacing between the flanges are such that when the connector is slidingly received onto the seat tube 24, there will be sufficient space between the flanges to enable clamping relationship of the connector onto the tube via a threaded means 34 having parts extending through opening 32. The length of the connector as measured along the seat tube axis is critical (preferably at least 2.0 inches) in that if it is too short there tends to be an excessive levering action on the seat tube which can effectively either damage the seat tube at the contact point or produce breakage of the supporting and bracing means connector 20 during use.

The arm 18 is unitary with the connector 20 and is generally C-shaped extending away from the connector in a rearward direction as assembled onto the seat tube. The upper end of the arm terminates at the pressure plate 22 which is a generally rectangular member with radiused corners having a flat surface facing generally toward the 13 seat and located spaced rearwardly from the seat. The arm is generally T-shaped in cross-section with a flat base portion 35 and a centrally located, continuous, outwardly extending ridge 36 on the base portion outer or convex surface for reinforcing the arm particularly against compressive stresses during use. A pad 38 constructed of plastic foam, for example, is removably secured to the forwardly facing surface of the support plate according to a first embodiment by means of a so-called "Velcro" connector where the plate surface is provided with either the loop or hook half of the releasable connection means and the other half is mounted onto the pad. The foam pad is preferably removable as just described since it receives a considerable amount of friction and body contact pressure during use and, therefore, may require replacement at relatively frequent periods depending upon the amount of use of the bicycle. Also, since the bicycle may be used by people of different size it may be found advisable to provide pads of different shape and thickness to accommodate different individuals.

In assembly onto a bicycle, it is necessary first to remove the seat and then slide the connector 20 down onto the seat tube such that the C-shaped arm 18 extends upwardly and rearwardly of the seat after which the seat can then be located at the proper height and clamped into position as already described. Finally, the connector 20 is positioned at the proper height on the seat tube in order to function properly for a given use of the bicycle. Although individual attitudes may vary, it is believed that optimum performance for average (non-racing) use is achieved when the pad faces the user's back and slightly downwardly so as to contact the back in the kidney region or slightly below on the buttocks when the user rises from the seat several inches.

Optionally, the connector 20 can be selectively clamped onto the seat tube 24 by a finger-actuated threaded means 34 (FIG. 1) or a so-called conventional Allen bolt and nut (not shown). Also, in this first version, the arm 18, connector 20 and plate 22 are preferably constructed as one-piece from molded aluminum, for example.

Figure 4:
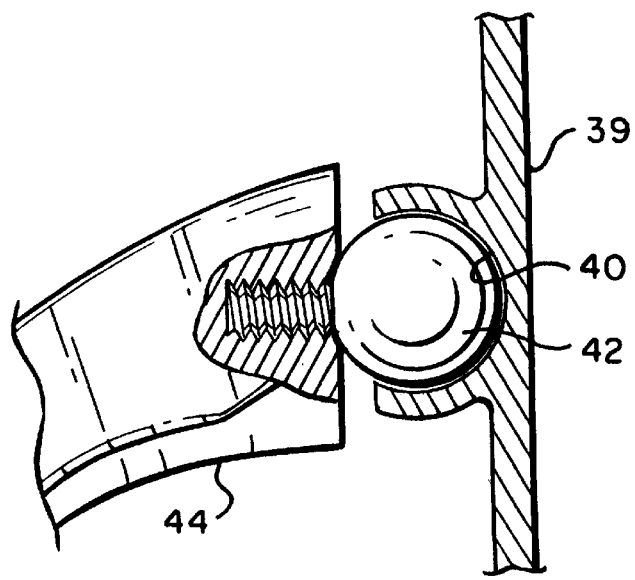
FIG. 4 shows an alternative embodiment in which the pad is provided with adjustability.

For the ensuing description of a further embodiment of the invention reference is now made to FIG. 4. As shown, the rear surface of a pressure plate 39 is formed to include a generally spherical chamber 40 within which is received a generally spherical element 42 secured to an end portion of a C-shaped arm 44, that is otherwise identical to arm 18. This construction provides a relatively wide range of adjustment for the pressure plate and pad mounted thereon to aid in accommodating persons of considerably different body sizes and shapes.

Figure 5:
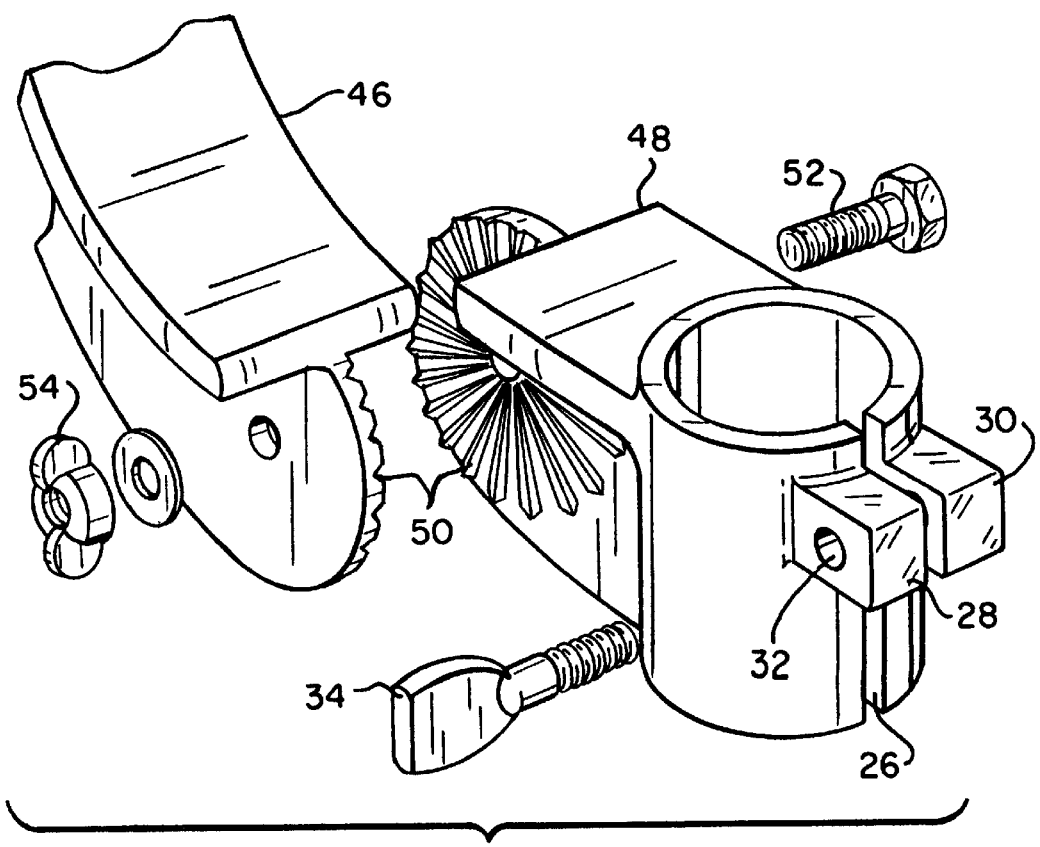
FIG. 5 is an elevational sectional, partially fragmentary, view of a further embodiment.

For the ensuing description of yet another embodiment, reference is made to FIG. 5. In particular, the C-shaped arm shown there is made in two parts 46 and 48 which are releasably interconnected by facing surfaces each having a plurality of spaced-apart indexing ridges 50. Accordingly, the parts can be selectively rotated with respect to each other to a desired adjustment and then secured together by a bolt 52 and nut 54 arrangement, for example.

Figure 6:
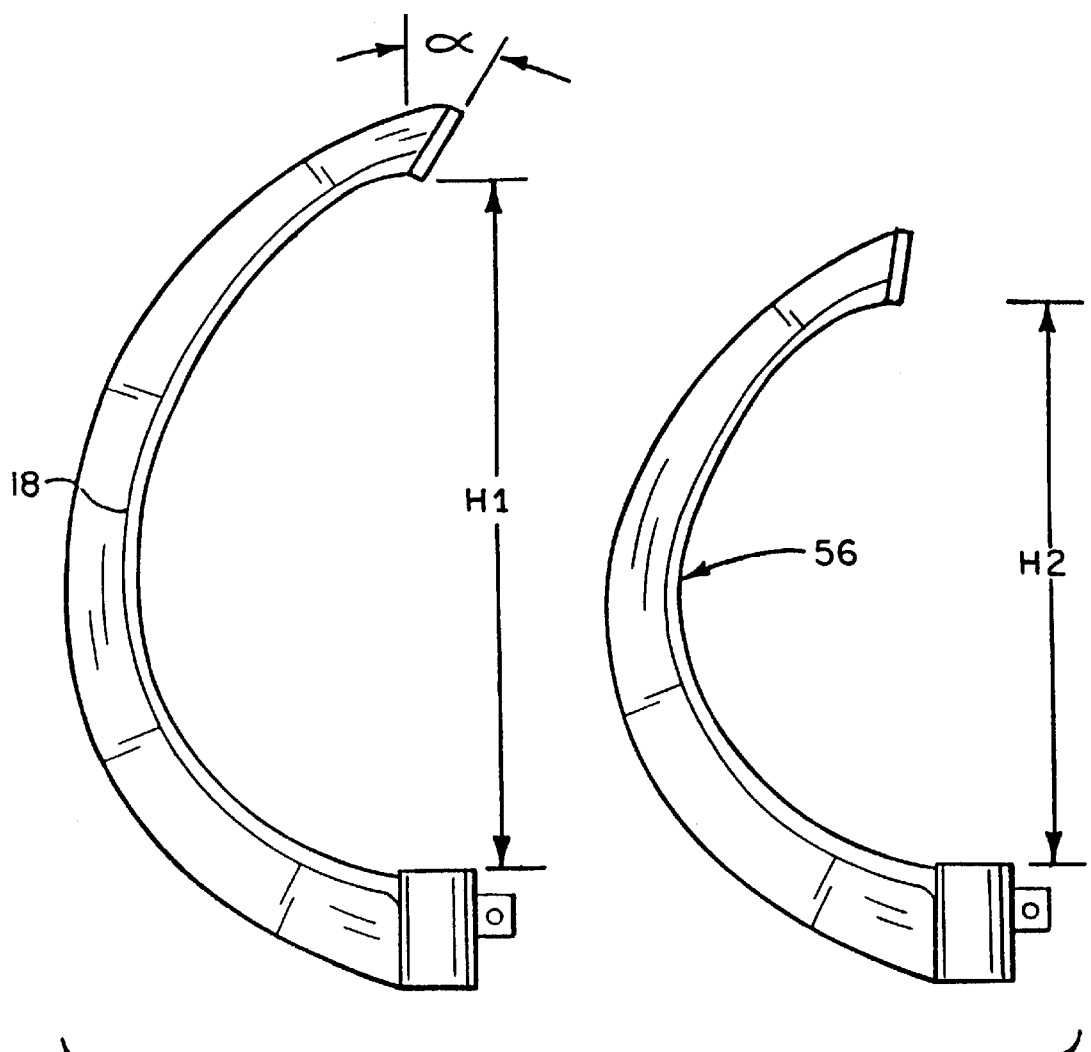
FIG. 6 is yet another embodiment of the invention especially advantageous for use with a racing bicycle.

FIG. 6 depicts a side elevational view of the C-shaped arm 18 for a construction of the invention contemplated for conventional recreational use. Also shown there is a further version of a C-shaped arm 56 specifically for use by a racer, for example, who typically will be operating the bicycle for extended periods of time at high speed. Although the shapes are similar, the arm 56 has a smaller radius of curvature and the height dimensions (H1, H2) for the two arms differ substantially. In practical constructions of the invention, H1=9.5 inches and H2=8.5 inches were the preferable dimensions.

Figures 7A, 7B:
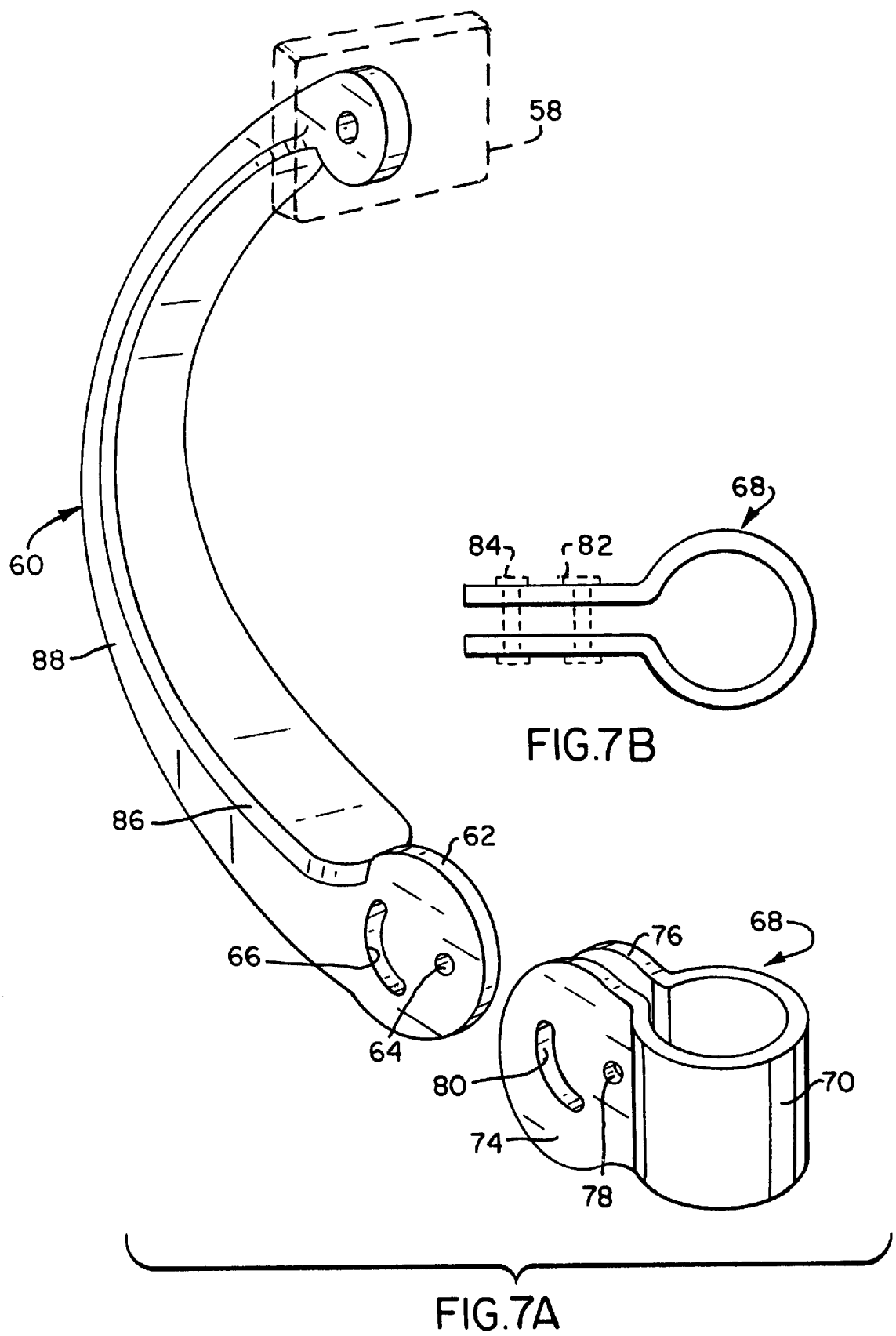
FIGS. 7A and 7B are a perspective of yet another version of the invention and a plan view of its seat tube connector, respectively.

FIG. 7A depicts yet another embodiment of the invention of two piece variety providing adjustability of location of a contacting pad represented schematically at 58. A first generally C-shaped arm 60 has the pad 58 connected at one end as in FIG. 3, for example, and has its other end formed into a plate-shaped member 62 which plate lies in the plane formed by the curvature of the arm. The member 62 has a first opening 64 and a second curved slotted opening 66 adjacent the first opening. A connector 68 has a tubular portion 70 having a bore 72 sufficient to enable receipt onto the seat tube 24 and a slotted wall with a pair of facing, outwardly extending flanges 74 and 76. The flanges include aligned holes 78 and curved slotted openings 80 enabling alignment with the corresponding openings in member 63 when the member is assembled in the connector space between the flanges. FIG. 7B shows securement of the parts by threaded means 82 ad 84 received through the aligned circular and curved slot openings.

The arm 60 is preferably molded metal (e.g., aluminum) of generally T-shaped cross-section having a cross-bar 86 on the concave part of arm 60 and outwardly extending central post part 88.

In the practice of the present invention there is provided a body support and brace for a bicycle. More particularly, the invention 14 is immovably secured to the upper end portion of the bicycle seat tube 24 and has a pad 22 that contacts the buttocks or immediately adjacent back portion of the cyclist when the cyclist rises slightly from the seat and begins to apply a driving force on the pedals which, in effect, braces the whole body at this time enabling optimal pedaling to be achieved. It is contemplated that the present invention will be most advantageous during racing or other cycling activity is engaged in requiring high speed or high-energy exertion for accomplishment.

Although the invention has been described in connection with preferred embodiments, it is to be understood that one skilled in the appertaining art may suggest modifications that come within the spirit of the described invention and the scope of the appended claims.

What is claimed is:

1. Body support and brace during pedal thrusting for a rider of a bicycle, comprising:

an upwardly extending seat support tube;

a seat secured to the upper end of the seat support tube;

a rigid generally C-shaped arm which includes a plate-shaped end portion having a first opening and a second elongated curved opening;

a hollow connector secured to an end of said arm including a tubular portion for sliding receipt onto the seat support tube underneath the seat, said tubular portion including a slotted opening;

first and second outwardly extending flanges on respectively opposite sides of said slotted opening and facing each other, each flange including a first opening and a second elongated curved opening, said C-shaped arm plate-shaped end portion being received between the flanges with the respective first openings being aligned with one another and the second curved openings being aligned;

first and second threaded means being received within the aligned first and second openings to secure the plate-shaped end portion and connector in a unitary angular relation;

plate means secured to another arm end having a surface unitary with said arm facing generally forwardly and downwardly toward the bicycle seat; and pad means releasably mounted to said plate means for resiliently contacting the back of the rider in a region selected from the buttock, and immediately adjacent back portion.

2. Body support and brace as in claim 1, in which the pad means includes a plastic foam pad.

3. Body support and brace as in claim 1, in which the pad means is positioned by the C-shaped arm to continuously contact a back portion of the bicycle rider.

4. Body support and brace as in claim 3, in which the straight line distance from the pad means to the connector is approximately 9.5 inches.

5. Body support and brace as in claim 1, in which the pad means is spaced from the back of a rider while the rider is seated on the seat and contacts said back region of the rider when the rider rises from the seat.

6. Body support and brace as in claim 5, in which the straight line distance from the pad means to the connector is approximately 8.5 inches.

7. Body support and brace as in claim 1, in which the C-shaped arm is generally T-shaped with a cross-bar and central post, said cross-bar extending along the concave part between the two ends of the arm and the central post extending outwardly away from said cross-bar.

* * * * *